United States Patent
Nathadi

(10) Patent No.: US 9,983,648 B2
(45) Date of Patent: May 29, 2018

(54) REGULATION OF PROCESSOR STATES

(71) Applicant: HEWLETT-PACKARD DEVELOPMENT COMPANY, L.P., Houston, TX (US)

(72) Inventor: Raghotham Reddy Nathadi, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/114,103

(22) PCT Filed: Mar. 31, 2014

(86) PCT No.: PCT/US2014/032387
§ 371 (c)(1),
(2) Date: Jul. 26, 2016

(87) PCT Pub. No.: WO2015/152878
PCT Pub. Date: Oct. 8, 2015

(65) Prior Publication Data
US 2017/0068293 A1    Mar. 9, 2017

(51) Int. Cl.
*G06F 1/26* (2006.01)
*G06F 1/28* (2006.01)
*G06F 1/08* (2006.01)
*H02J 7/00* (2006.01)

(52) U.S. Cl.
CPC .................. *G06F 1/28* (2013.01); *G06F 1/08* (2013.01); *G06F 1/26* (2013.01); *G06F 1/263* (2013.01); *H02J 7/007* (2013.01)

(58) Field of Classification Search
CPC ....................................................... G06F 1/263
See application file for complete search history.

(56) References Cited

U.S. PATENT DOCUMENTS

| | | | |
|---|---|---|---|
| 7,961,111 B2 | 6/2011 | Tinaphong et al. | |
| 8,429,441 B2 | 4/2013 | Baker et al. | |
| 2006/0097132 A1 | 5/2006 | Nam et al. | |
| 2011/0022857 A1 | 1/2011 | Nussbaum et al. | |
| 2011/0071781 A1* | 3/2011 | Akahane | B60L 11/1853 702/63 |
| 2011/0258477 A1 | 10/2011 | Baker et al. | |
| 2012/0166854 A1 | 6/2012 | Rotem et al. | |
| 2013/0007475 A1 | 1/2013 | Ganesan et al. | |
| 2013/0035797 A1* | 2/2013 | Allen-Ware | G06F 1/324 700/286 |

(Continued)

FOREIGN PATENT DOCUMENTS

WO    WO-2013137859    9/2013

OTHER PUBLICATIONS

Qian, et al; "Turbo-boost Charger Supports CPU Turbo Mode", <http://www.ti.com/lit/an/slyt448/slyt448.pdf>, Feb. 22, 2012.

*Primary Examiner* — Albert Wang
(74) *Attorney, Agent, or Firm* — HPI Patent Department

(57) ABSTRACT

A computing device can include a battery and a processor to draw a first level of current from the battery in a rated state a second level of current from the battery greater than the first level of current in a boost state. The device can include logic to monitor the number of times the second level of current is drawn from the battery and regulate the boost state from causing the second level of current when a threshold is reached.

15 Claims, 5 Drawing Sheets

(56) References Cited

U.S. PATENT DOCUMENTS

| | | | |
|---|---|---|---|
| 2013/0042133 A1 | 2/2013 | Luo et al. | |
| 2013/0152098 A1 | 6/2013 | Francois et al. | |
| 2014/0184143 A1* | 7/2014 | Coakley | H02J 4/00 320/107 |
| 2015/0268713 A1* | 9/2015 | Jain | G06F 1/3212 713/320 |

* cited by examiner

REGULATION OF PROCESSOR STATES

BACKGROUND

Processor boost technology provides more performance when needed. Processor boost technology automatically allows processor cores to run faster than the thermal design power (TDP) configuration specified frequency if they're operating below specification limits. Processor boost technology may be activated when the Operating System (OS) requests the highest processor performance state.

BRIEF DESCRIPTION OF THE DRAWING

Some examples of the invention are described was respect to the following figures.

DETAILED DESCRIPTION

Figure 1:
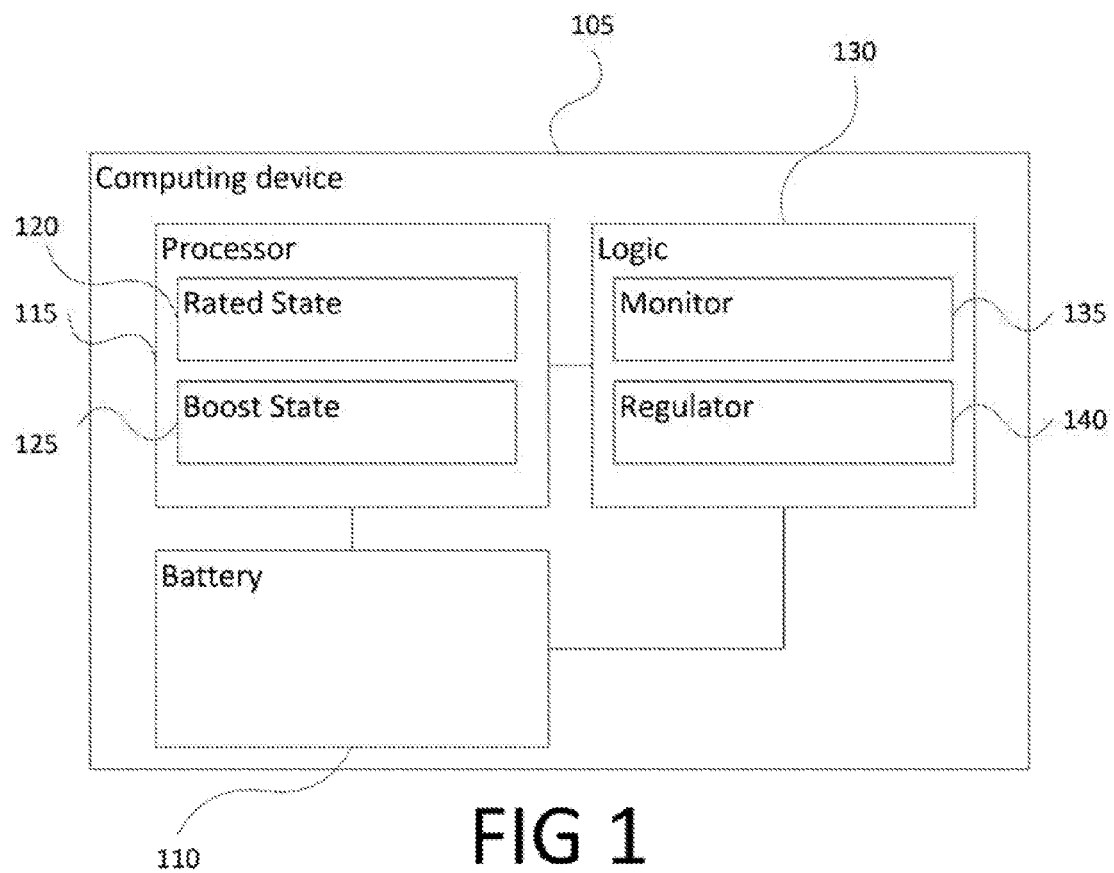
FIG. 1 is a block diagram of a computing device to an example implementation.

Processor boost technology may cause an increase current draw when the highest processor performance state is requested. A processor has a rated frequency and in the boost state the processor may operate at a frequency above the rated frequency causing the increase of current drawn by the processor as compared to current drawn at a rated frequency. The increase in current drawn may be for a short period of time. The short period of time may not trip the over current thresholds of the battery that would cause the battery to stop providing current to the computing device. For example, a battery may have a first over current threshold level, of 1.3 times the rated current over 10 seconds. Another example, a battery may have a second over current threshold level of 10 or 15 amps on a 5 amp rated battery over a time of 10 milliseconds.

Processor boost technology may draw over e rated current for the battery but for a short time. For example the processor may cause twice the rated current to be drawn from the battery but for less time than would cause the over current protection circuit from shutting off the battery. If the battery is rated at 5 amps and the processor draws 10 amps in the boost condition the processor may draw 10 amps for less than the time that would trip the over current protection circuit such as less than 10 milliseconds.

Even though the boost technology does not cause the over current protection circuits from electrically disconnected the battery from supplying power to the processor the current drawn over the rated current may damage the battery. The damage to the battery may cause the battery to fail after less charge cycles than battery would fail without having current drawn above the rated current by the processor in a boost state.

In one example, a computing device can include a battery and a processor to draw a first level of current from the battery in a rated state and a second level of current from the battery greater than the first level of current in a boost state. The device can include logic to monitor the number of times the second level of current is drawn from the battery and regulate the boost state from causing the second level of current when a threshold is reached.

In another example, a method of regulating processor conditions of a computing device includes receiving a signal to transition a processor from a rated state when a first level of current is drawn to a boost state when a second level of current greater than the first level of current is drawn. The method includes determining if the processor is receiving current from a battery. The method then regulates the transitioning from the rated state to the boost state based on previous transition from the rated state to the boost state when the computing device was receiving current from the battery when the processor receiving current from the battery.

In another example, a non-transitory computer readable medium can include code that if executed by at least one controller of a computing device can retrieve from a storage, information about transitions of the processor from a rated state drawing first current to a boost state drawing a second current higher than the first current. The code can cause the controller to determine if the processor is receiving current from the battery and regulate the transition from the rated state to the boost state based on the information in the storage and whether the processor is receiving current from the battery.

With reference to the figures, FIG. 1 is a block diagram of a computing device according to an example implementation. A computing device 105 can include a battery 110. The battery can be a lithium ion (Li-ion) battery, a Li-polymer or another type of battery technology. The battery may have a controller to control the charging and discharging of the battery. The controller may receive data regarding current drawn from the battery and may cause the battery to discontinue supplying current when the current, being drawn is over a threshold amount. In some implementation the current would have to be over the threshold amount for a period of time before the controller would discontinue supplying current by the battery. For example the threshold may be dependent on the rated current. For example a threshold may be 1.3 times the rated threshold of a battery over 10 seconds and if the current exceeds 1.3 times the rated current for over 10 second the over current will be tripped. In another example a threshold may be 2 times the rated current or may be a set amount such as 10 amps for 10 milliseconds. To prevent the controller from discontinuing the supply of current from the battery the system has to draw current below the threshold or if the threshold is exceeded then the duration cannot be longer than the threshold time.

A processor 115 can draw current n a number of different conditions. The different conditions may be dependent the level of use of the processor, for example if the processor has a lot of instructions or data to process the processor may transition from a low power condition to a higher power condition. An operating system or an application may cause the processor to enter a different condition based on the demand for processing power from the processor.

The processor 115 can draw first revel of current from the battery 110 in a rated state 120 and a second level of current from the battery greater than the first level, of current in, a boost state 125. The when in the boost state 125 the processor may draw more current than the battery is rated for causing damage to the battery but the boost state 125 may last for a short time, such as less than 10 milliseconds, so as not to cause the battery controller to discontinue supplying current. The rated state may be a state of the processor wherein the processor operates at a rated frequency and the boost state of the processor may be when the processor operates at a frequency above the rated frequency of the processor.

The battery may have a specified r umber of charging cycles and a rated current. When the rated current is exceeded the damage to the battery may cause the specified number of charging cycles to be reduced such that the battery may need to be prematurely replaced.

Logic 130 can monitor 135 the number of times the second level of current is drawn from the battery. The logic 130 may be an ASIC (application specific integrated circuit), may be a controller executing software or firmware or may be other logic. The logic 130 may include a regulator 140 to regulate the boost state from causing the second level of current when a threshold number of times is reached. A battery may be rated for example for 1200 charge cycles however exceeding the current rating of the battery may reduce the charge cycles before the battery fails. A battery manufacturer may want the battery to last 3 year and the age number of charge cycles to reach 3 years of life may be 1000, therefore if the logic determines that the boost states have caused the battery to be damages then the logic 130 may determine if and for how long the boost state of the processor may be entered to extend the life of the battery to 3 years. The logic 130 may prevent the processor from operating in the boost state or may reduce the time the processor is in the boost state. The logic may track for example how many times the boost state, of the process is entered and for how long each time. The logic may use data about previous use of the boost state to determine how to prevent premature failure. An example of the logic may be that after 600 cycles the logic begins to reduce the time of the boost state to 6 milliseconds rather than 10 milliseconds or may prevent the boost state, although the logic's determination may be dependent on the type of battery or the rating of the battery for example.

Figure 2:
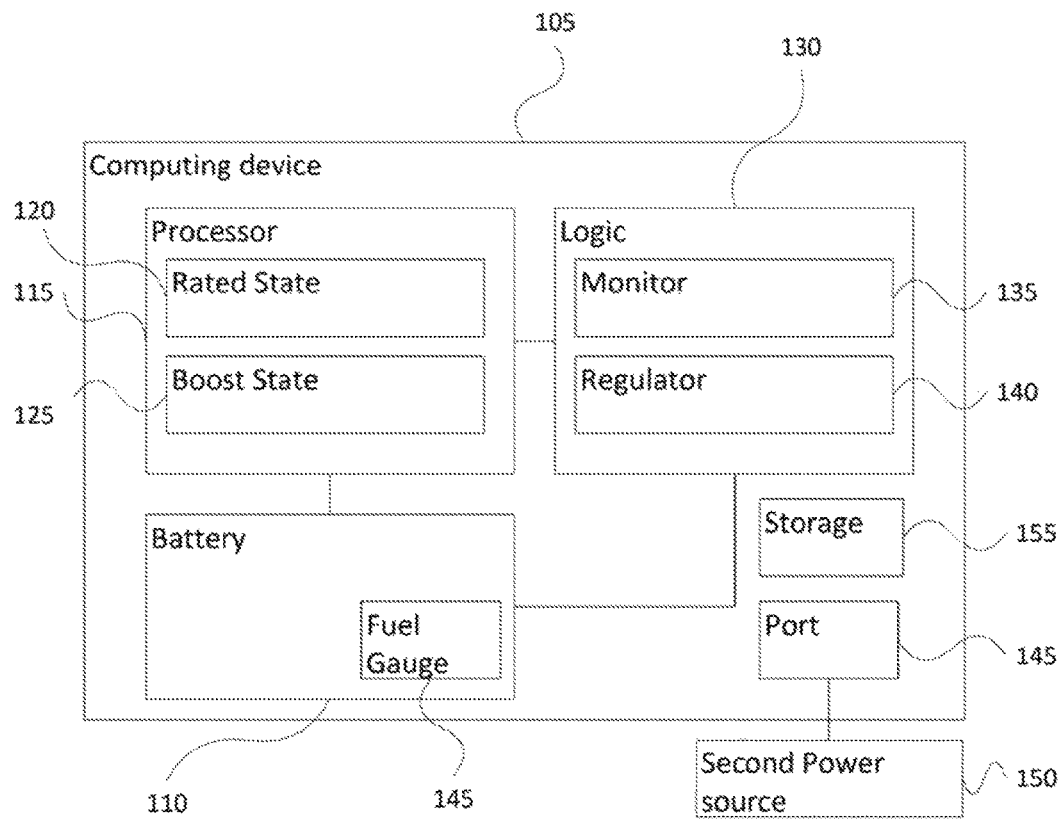
FIG. 2 is a block diagram of a computing device according to an example implementation.

FIG. 2 is a block diagram of a computing device according to an example implementation. The computing device 105 may include a port 145 to receive power from a second power source 150. The second power source may be an alternating current to direct current power supply (AC/DC power supply). The AC/DC power supply can convert power from a wall outlet for example to power used by the computing device 105. When power for the processor 115 is received from the second power source the logic 130 may not prevent the boost state 125 as the prevention of the boost state 125 is to prevent the boost state 125 from causing premature failure of the battery and if the current is not being drawn from the battery in the boost state 125 then regulating the current by the regulator 140 of the logic 130 would not extend the life cycle of the battery 110. The logic 130 regulates the boost state when the device is drawing current from the battery 110 and may not regulate the boost state when the device is drawing current from a second power source 150. In some implementations the secondary power source 150 is rated so at the processor may operate at the rated state, if however the processor transitions to the boost state the secondary power source 150 may not be rated to handle the increased current draw and may draw current from the battery 110 to make up for the deficiency of the secondary power source 150 to supply the current to the processor for the boost state. If the battery supplies current when the secondary power source 150 is deficient the logic 130 may regulate the boost state 125. For example, if the secondary power source is rated at 45 watts and the computer would draw more than 45 watts if the processor is in the boost state the processor may draw some current from the battery to prevent the secondary power supply from supplying over the secondary power supply rating which would cause the logic 130 to regulate the boost state of the processor.

The computing device 105 can include a storage 155. The storage 115 may be a non-volatile memory such as flash memory, a hard disk drive or another type of non-volatile memory. The storage can be used to store data about boost states monitored by the monitor 135. In one example the storage 155 may store the number of times the boost state occurs, may store the duration of the boost state or other data about previous boost states.

The logic 130 can then use the data about the boost state 145 stored in the storage 155 to determine if the boost state should be regulated by the regulator 140.

The storage may be part of the battery fuel gauge 145 circuit. The battery fuel gauge is attached to the battery module 110 so that if the battery is removed the battery fuel gauge 145 remains attached to the battery 110. If the battery is embedded in the electronic device and removal of the battery the electronic device case would have to be opened then the fuel gauge 145 may not be part of the battery module 110.

Figure 3:
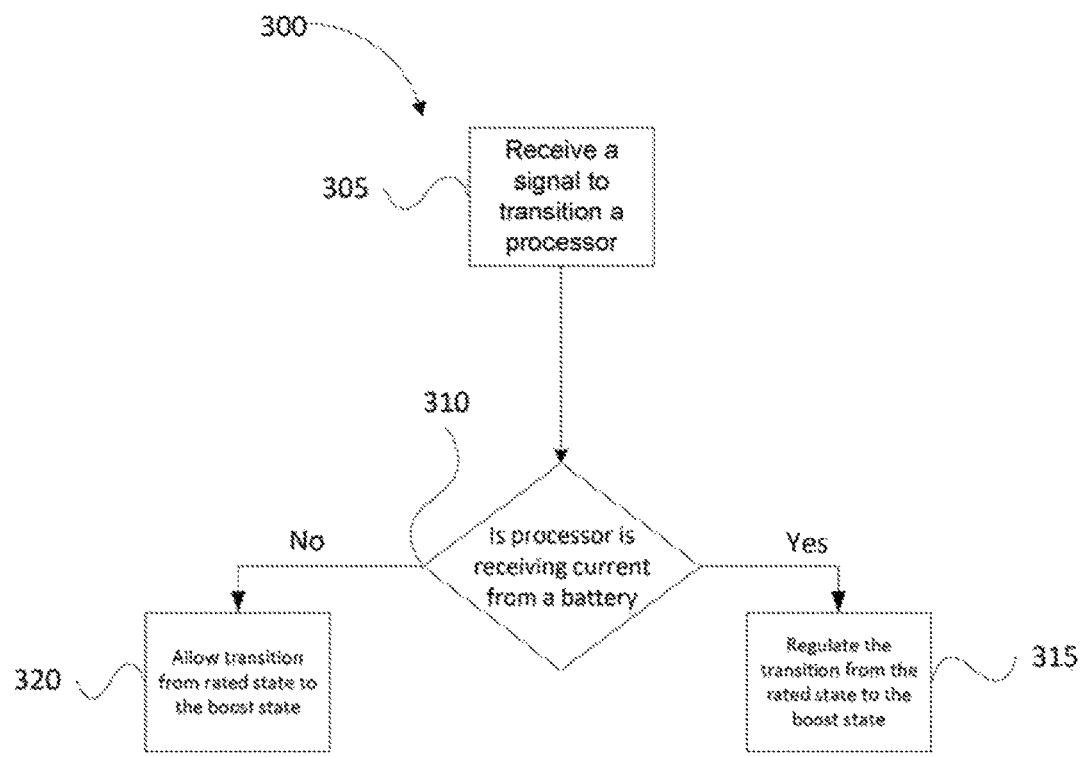
FIG. 3 is a flow diagram of a method of regulating processor conditions according to an example implementation.

FIG. 3 is a flow diagram of a method 300 regulating, processor conditions according to an example implementation. The method of regulating processor conditions of a computing device can include receiving a signal to transition a processor from a rated state when a first level of current is drawn to a boost state when a second level of current greater than the first level of current is drawn at 305. The signal can be caused by an operating system or application that causes the signal to be generated based on processing need.

It can then be determined processor is receiving current from a battery at 310. The determination at may be by logic such as logic 130. If the processor is not receiving current from the battery then the method proceeds to 320. At 320, the method allows the transition from the rated state to the boost state. The transition may be allowed because damage to the battery does not occur when the processor is not drawing current from the battery. In some implementations the boost state may be regulated to prevent overloading a second power source when the battery is not available to provide current to the processor in the boost state.

If it is determined at 310 that the processor receiving current from the battery then the method proceeds to 315. At 315, the method regulates the transitioning from the rated state to the boost state based on previous transition from the rated state to the boost state.

Figure 4:
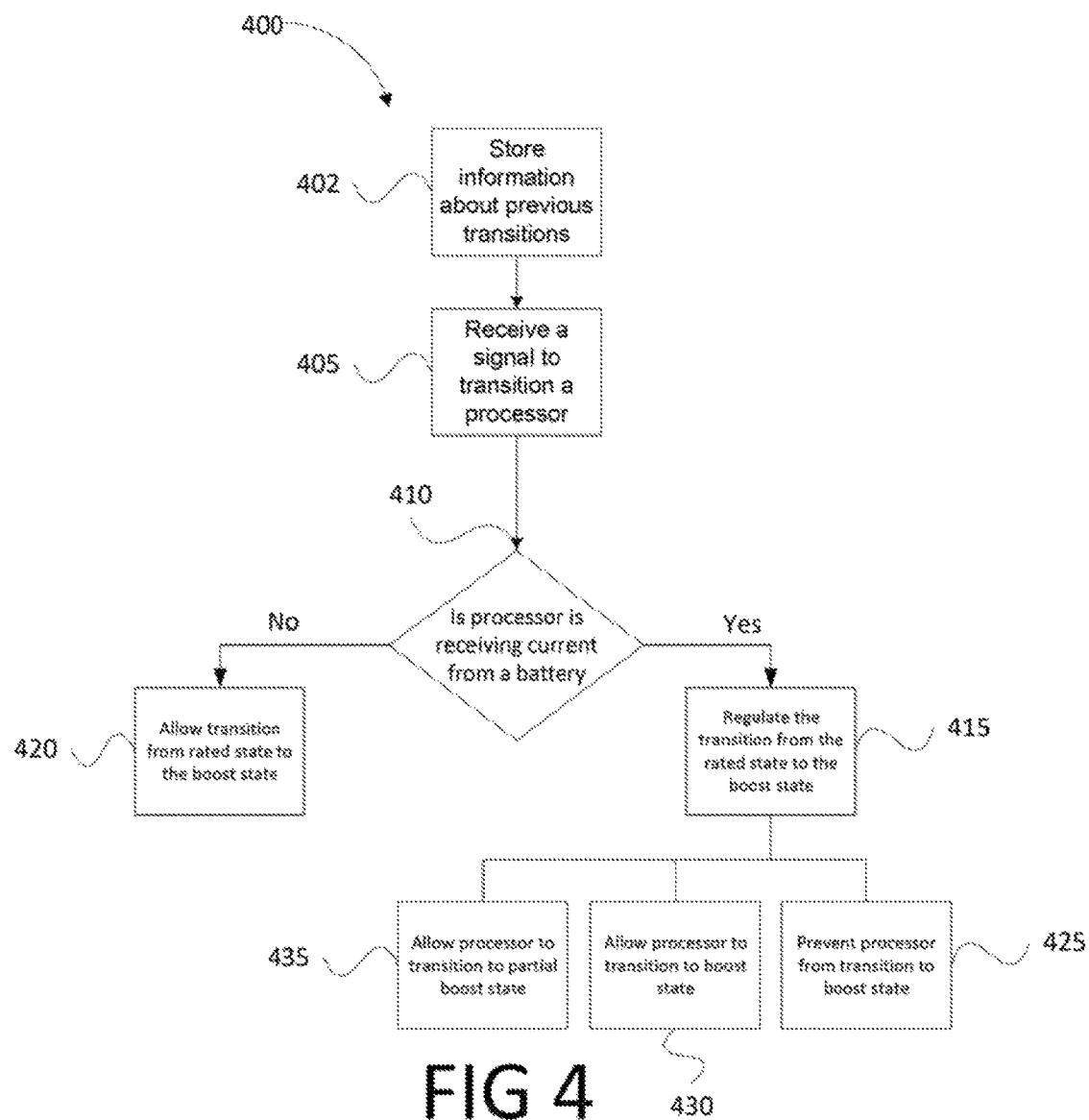
FIG. 4 is a flow diagram of method of regulating processor conditions according to an example implementation.

FIG. 4 is a flow diagram of a method of regulating processor conditions according to an example implementation. The method 400 can include storing information about the previous transitions from the rated state to the boost state at 402. The information may be stored in a controller coupled to the battery such as the battery fuel gauge. The battery fuel gauge may include the logic 130.

The method of regulating processor conditions of a computing device can include denting a signal to transition a processor from a rated state when a first level of current is drawn to a boost state when a second level of current greater than the first level of current is drawn at 405. The signal can be caused by an operating system or application that causes the signal to be generated based on processing need.

It can then be determined if the processor is receiving current from a battery at 410. The determination at 410 may be by logic such as logic 130. If the processor is not receiving current from the battery then the method proceeds to 420. At 420, the method allows the transition from the rated state to the boost state. The transition may be allowed because damage to the battery does not occur when the processor is not drawing current from the battery.

If it is determined at 410 that the processor is receiving current from the battery then the method proceeds to 415. At 415, the method regulates the transitioning from the rated state to the boost state based on previous transition from the rated state to the boost state.

Regulating the transition from the rated state to the boost state at 415 may result in the prevention of the processor from transitioning from the rated state to the boost state at 425, may result in adjusting the duration of the boost state or adjusting the current drawn resulting in a partial boost state at 435, or may allow the processor to transition to the boost state at 430. The partial boost state may for example be when the maximum boost current or maximum boost duration is prevented but processor does increase current drawn for a shorten period of time.

Figure 5:
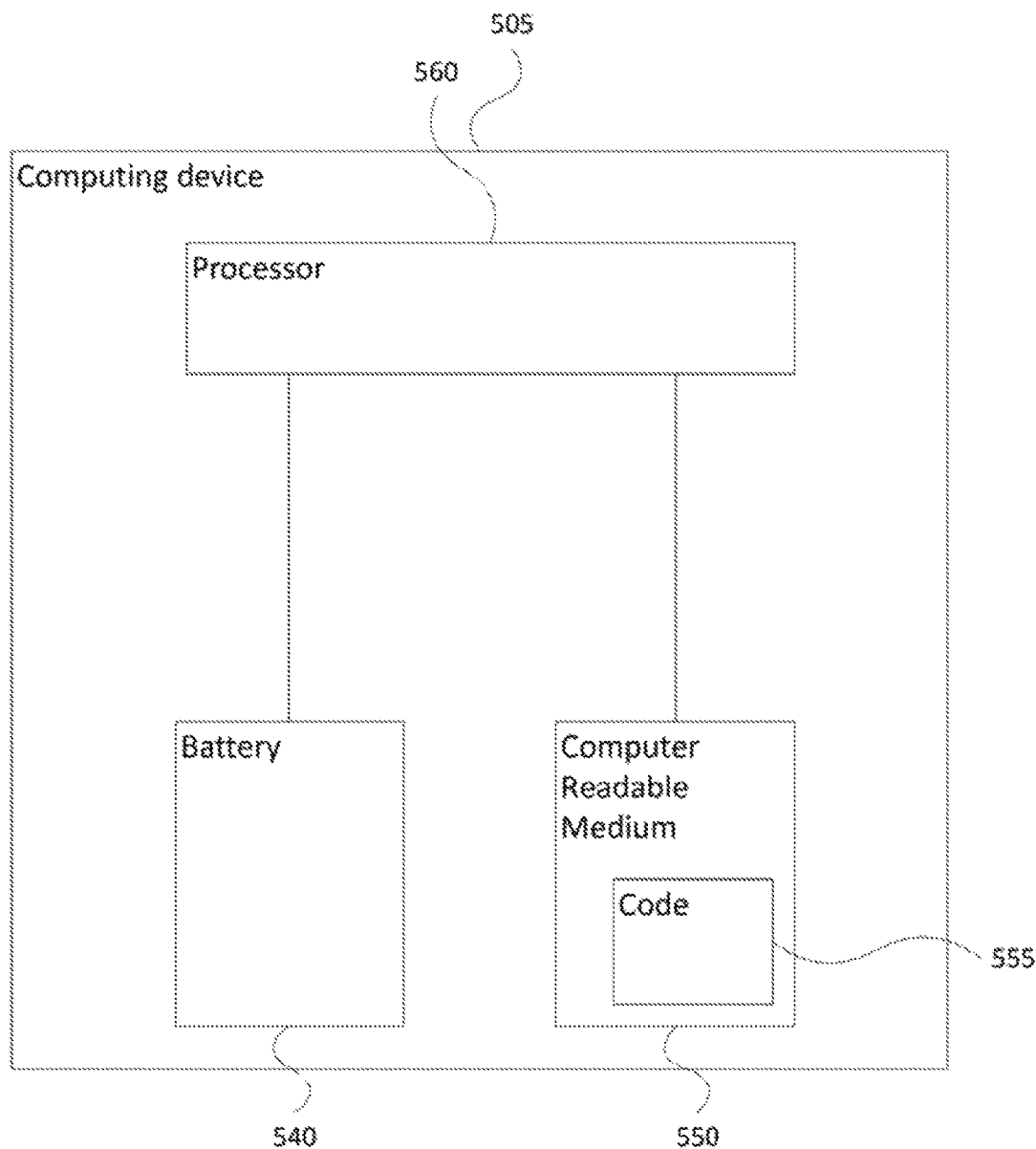
FIG. 5 is a computing system including a computer readable medium according to an example implementation.

FIG. 5 is a computing system including a computer readable medium according to an example implementation. The computing device 505 may include a non-transitory computer readable medium 550. The computer readable medium 550 may include code that if executed by at least one controller of a computing device to retrieve from a storage information about transitions of the processor from a rated state drawing first current draw to a boost state drawing a second current higher than the first current. The code 555 when executed may determine if the processor 560 is receiving current from the battery 540. The code 555 when executed can regulate the transition from the rated state to the boost state based on the information in the storage and whether the processor is receiving current from the battery.

The techniques described above may be embodied in a computer-readable medium for configuring a computing system to execute the method. The computer readable media may include, for example and without limitation, any number of the following non-transitive mediums: magnetic storage media including disk and tape storage media; optical storage media such as compact disk media (e.g., CD-ROM, CD-R, etc,) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

The use of "comprising", "including" or "having" are synonymous and variations thereof herein are meant to be inclusive or open-ended and do not exclude additional unrecited elements or method steps. It should also be noted that a plurality of hardware and software based devices, as well as a plurality of different structural components may be used to implement the disclosed methods and systems.

In the foregoing description, numerous details are set forth to provide an understanding of the present invention. However, it will be understood by those skilled in the art that the present invention may be practiced without these details. While the invention has been disclosed with respect to limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
a battery;
a processor to draw a first level of current from the battery in a rated state and a second level of current from the battery greater than the first level of current in a boost state; and
logic to monitor the number of times the second level of current is drawn from the battery and regulate the boost state, wherein regulation involves selecting one of deterring a transition from the rated state to the boost state, adjusting a duration of the boost state, and allowing the processor to transition from the rated state to the boost state, and wherein the regulation is based on a threshold number of times the processor transitions to the boost state.

2. The device of claim 1, further comprising a port to receive power from a second power source, wherein when power is received from the second power source the logic does not prevent the boost state.

3. The device of claim 1, further comprising a storage to store the number of times the boost state occurs.

4. The device of claim 1, further comprising a storage to store a duration of the boost state.

5. The device of claim 3, wherein the storage is a battery fuel gauge.

6. The device of claim 5, wherein the battery is removable and the battery fuel gauge is part of the battery.

7. The device of claim 1, where the regulation of the boost state regulates a duration of the boost state.

8. The device of claim 1, wherein the logic regulates the boost state when the device is drawing current from the battery and does not regulate the boost state when the device is drawing current from a second power source.

9. A method of regulating processor conditions of a computing device comprising:
receiving a signal to transition a processor from a rated state when a first level of current is drawn to a boost state when a second level of current greater than the first level of current is drawn;
determining if the processor is receiving current from a battery;
determining if the processor is to be regulated based on monitored data; and
regulating, when the processor is receiving current from the battery and to be regulated based on monitored data, the transitioning from the rated state to the boost state based on previous transition from the rated state to the boost state when the computing device was receiving current from the battery, wherein regulation involves selecting one of deterring a transition from the rated state to the boost state, adjusting a duration of the boost state, and allowing the processor to transition from the rated state to the boost state, and wherein the regulation is based on a threshold number of times the processor transitions to the boost state.

10. The method of claim 9, further comprising storing information about the previous transitions from the rated state to the boost state.

11. The method of claim 9, further comprising storing information about the previous transitions from the rated state to the boost state in a controller coupled to the battery.

12. The method of claim 9, further comprising preventing the processor from transitioning from the rated state to the boost state during the regulating.

13. The method of claim 9, further comprising adjusting a duration of the boost state during the regulation.

14. A non-transitory computer readable medium comprising code that if executed by at least one controller of a computing device to:
- retrieve from a storage information about previous transitions of a processor from a rated state drawing first current draw to a boost state drawing a second current higher than the first current;
- determine if the processor is receiving current from a battery;
- regulate the transition from the rated state to the boost state based on the information in the storage and whether the processor is receiving current from the battery; and
- select one of deterring a transition from the rated state to the boost state, adjusting a duration of the boost state, and allowing the processor to transition from the rated state to the boost state, and wherein regulation is based on a threshold number of times the processor transitions to the boost state.

15. The computer readable medium of claim 14 further comprising code that if executed causes a computing device to:
- store information about a transition from the rated state to a boost state.

* * * * *

UNITED STATES PATENT AND TRADEMARK OFFICE
CERTIFICATE OF CORRECTION

PATENT NO. : 9,983,648 B2
APPLICATION NO. : 15/114103
DATED : May 29, 2018
INVENTOR(S) : Raghotham Reddy Nathadi et al.

Page 1 of 1

It is certified that error appears in the above-identified patent and that said Letters Patent is hereby corrected as shown below:

On the Title Page

Item (57), Column 2, Line 2, after "state" insert -- and --.

Signed and Sealed this
Ninth Day of October, 2018

Andrei Iancu
*Director of the United States Patent and Trademark Office*